United States Patent [19]
Pockrandt

[11] 3,979,328
[45] Sept. 7, 1976

[54] AUTOMATIC CONTROL FOR PROCESS FOR THERMALLY GASIFYING HYDROCARBONS WITH OXYGEN AND WATER VAPOR

[75] Inventor: Günther Pockrandt, Bad Homburg, Germany

[73] Assignee: Metallgesellschaft Aktiengesellschaft, Frankfurt am Main, Germany

[22] Filed: Nov. 12, 1974

[21] Appl. No.: 523,191

[30] Foreign Application Priority Data
Dec. 6, 1973  Germany............... 2360757

[52] U.S. Cl................. 252/373; 48/215; 23/255 E; 23/281
[51] Int. Cl.².......................... C01B 2/14
[58] Field of Search................ 252/373; 48/215; 208/DIG. 1

[56] References Cited
UNITED STATES PATENTS

| | | | |
|---|---|---|---|
| 1,988,929 | 1/1935 | Wilson | 252/373 |
| 2,353,538 | 7/1944 | Barber | 252/373 |
| 2,546,013 | 3/1951 | Peck et al. | 252/373 |
| 2,751,362 | 6/1956 | Laird | 252/373 |
| 3,402,121 | 9/1968 | Hallman | 208/DIG. 1 |
| 3,533,764 | 10/1970 | Togneri | 48/215 X |
| 3,820,964 | 6/1974 | Janka | 48/215 |

OTHER PUBLICATIONS
Perry's Chemical Engineers Handbook, McGraw Hill, New York 4th ed. (1963) pp. 22-63 to 22-70, 22-85 to 22-87. 1,000°–valves

*Primary Examiner*—Howard T. Mars
*Attorney, Agent, or Firm*—Burgess, Dinklage & Sprung

[57] ABSTRACT

Hydrocarbons are thermally gasified with oxygen and water vapor as gasifying agents under a pressure of at least 3 kilograms per square centimeter and at temperatures in the range of about 1,000–1,500°C in a reactor having supply conduits for the hydrocarbons, the gasifying agents, and an inert purging gas. The hydrocarbon and gasifying agents supply conduits are opened and closed by suitable valves and means are provided for scrubbing the product gas which contains mainly carbon monoxide and hydrogen. Opening and closing of the supply conduit valve in controlled sequences during out-of-normal operation of the gasification plant, particularly during periods of start-up and shut-down is accomplished by a permanently wired electric circuit initiated by an operator which causes an automatic performance of successive control actions.

4 Claims, 6 Drawing Figures

AUTOMATIC CONTROL FOR PROCESS FOR THERMALLY GASIFYING HYDROCARBONS WITH OXYGEN AND WATER VAPOR

BACKGROUND

This invention relates to a process of thermally gasifying hydrocarbons with oxygen and water vapor as gasifying agents under a pressure of at least 3, preferably at least 20 to above 100 kilograms per square centimeter, and at temperatures in the range of about 1000°–1500° C., in a reactor provided with supply conduits for the hydrocarbons, the gasifying agents, and an inert purging gas, particularly nitrogen, which supply conduits are adapted to be opened and closed by valves, and with means for cooling and scrubbing the product gas, which mainly contains carbon monoxide and nitrogen.

Gasification processes of this kind are carried out in most cases to gasify fuel oil by a partial oxidation and are known, e.g., from the Opened German Applications Nos. 1,667,628 and 2,117,236. Because the plants for carrying out these processes operate under rather extreme temperature and pressure conditions, trouble may often arise. For instance, there may be sudden leaks, clogged filters in the hydrocarbon conduit, electric power failures, failures in preceding equipment or human errors in the control of the plant.

Most troubles require shutdown of the plant to such an extent that the degasifying operation is interrupted. The shut-down and restarting of the plant require a sensitive and exact matching and control of various variables which can be performed only by highly skilled operators. After an only short interruption of the gasifying normal operation, the plant can be rapidly restarted only when the temperature in the gasification reactor has not dropped below about 900° C. during the shut-down period. This can be ensured by a quick correction of the defect and by a quick and correct control of the plant. Additional measures may be adopted to maintain the reactor at the desired temperature when normal operation has been interrupted. The optimum control of a gasifying plant, particularly when it is not in normal operation, requires operators that have been trained at high expense, but even such operators do not ensure a fault-free control.

SUMMARY

The invention provides a basic simplification of a process of the kind mentioned first hereinbefore. This is accomplished in that in control sequences during an out-of-normal operation of the gasifying plant, particularly during start-up and shut-down periods, the opening and closing of the valves are accomplished by a permanently wired electric circuit, the operation of which is initiated by an operator and which causes an automatic performance of successive control actions. The automatic control can act, e.g., to accelerate the start-up to such a high degree that even plants comprising a plurality of parallel lines with several reactors may be started up without a delay. This may have the result, e.g., that there is no need for holding the reactors at temperature by additional measures when the entire plant is shut down. Besides, the required control operations are always performed completely and in the correct order.

The control of the start-up of the gasifying process suitably includes a first control subsequence during which the hydrocarbons and gasifying agents are supplied or their supply is controlled such that the hydrocarbons flow in an annular conduit from their supply tank and back into the same tank and the gasifying agents are blown off to the atmosphere in a common conduit.

When the gasifying operation has been shut down, it is essential that oxygen and water vapor do not enter the reactor. This may be prevented by the provision of tightly sealing valves in the corresponding supply conduits. It has proved even more desirable, however, to shut off, e.g., the oxygen conduit by a three-valve system, in which two valves are connected in series and a tap conduit connected between said two valves contains a valve which permits any oxygen which has leaked through the closed first valve to escape into the atmosphere. In the gasifying agent conduit this three-valve system is modified by the use of a system of three shut-off valve fittings, also with a conduit into the open.

DESCRIPTION OF THE DRAWING

Details of the process and of the control means will be explained more fully and by way of example with reference to the drawing, in which.

DESCRIPTION

Figure 1:
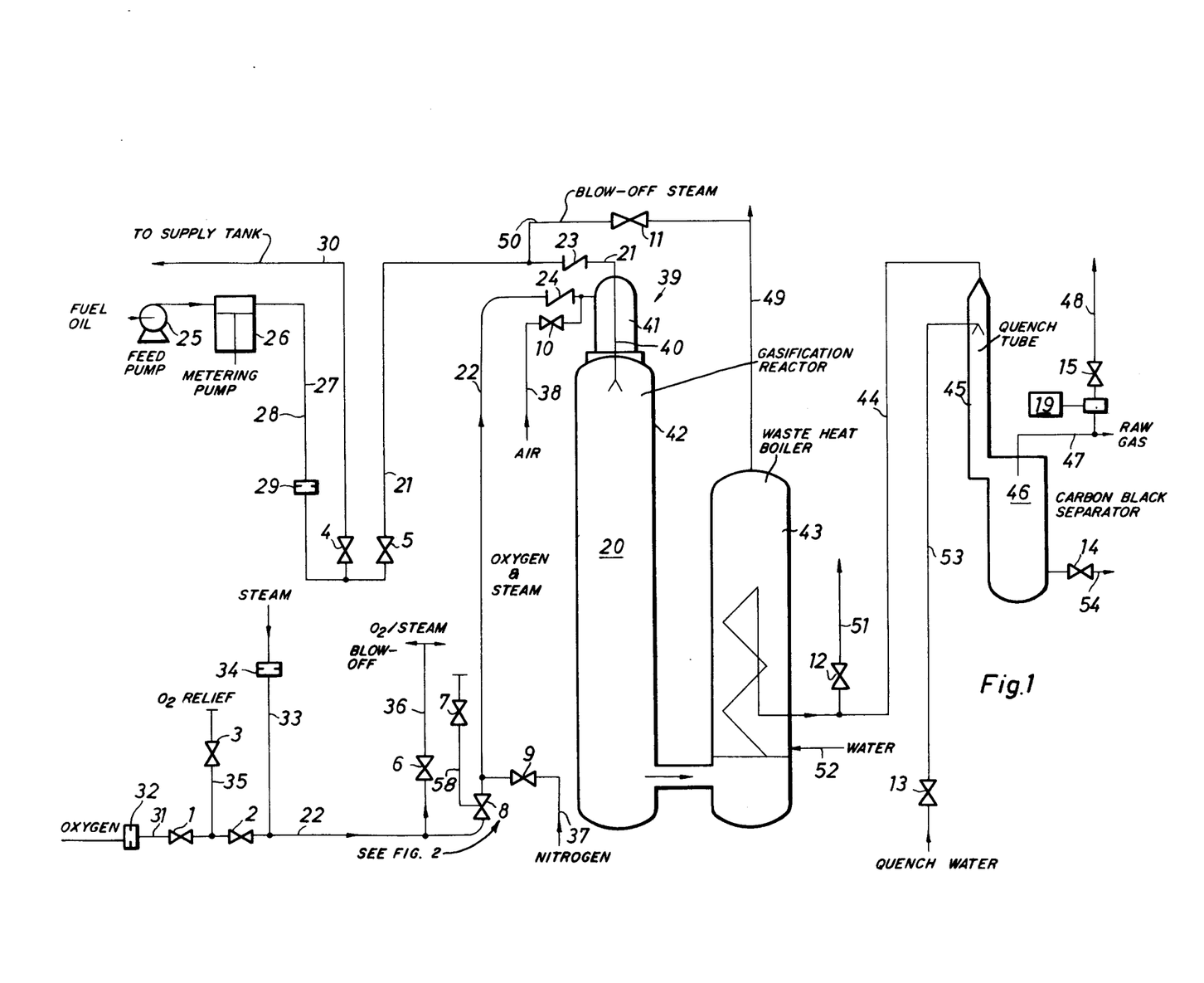
FIG. 1 is a flow diagram of a gasifying plant, according to the invention.

As is apparent from FIG. 1, hydrocarbons, e.g., fuel oil, from conduit 21 are reacted in the reactor 20 with the gasifying agents oxygen and water vapor from the gasifying agent conduit 22 by partial oxidation. The fluids flow freely to the reactor through the two check valves 23 and 24. By a feed pump 25 the hydrocarbons are sucked from a supply tank (not shown) and delivered to a metering pump 26, which delivers the hydrocarbons into a conduit 27, in which the flow of hydrocarbons is monitored by a pressure gauge 28 and a flow meter 29. The conduit 27 branches into the conduit 21 and a return conduit 30, which leads back to the hydrocarbon supply tank. The conduit 30 is adapted to be closed by the valve 4 and the conduit 21 by the valve 5.

The gasifying agents are oxygen and water vapor. Carbon dioxide may be used too but will not be taken into account hereinafter. Oxygen comes from conduit 31 provided with a flow meter 32. Water vapor is supplied through conduit 33 and its rate is also monitored by a flow meter 34. The gasifying agents mix in conduit 22. The reliable closing of the oxygen conduit 31 is ensured by valves 1 and 2 and by a tap conduit 35 provided with a valve 3. When the oxygen supply is shut down, the valves 1 and 2 are closed and the valve 3 is open and enables any oxygen which has leaked through the valve to escape into the open through relief tap conduit 35 without a build up of pressure on the closed valve 2. During the operation of the gasifying plant, the valves 1 and 2 are open.

The gasifying agent conduit 22 is opened and closed by the cooperation of the valves 8 and 7, the operation of which will be explained hereinafter with reference to FIG. 2.

A blow-off pipe 36 branches from the gasifying agent conduit 22 and is opened and closed by the valve 6. Gasifying agents can escape into the open through the opened blow-off pipe 36. Downstream of the valve 8 a nitrogen supply conduit 37 opens into the conduit 22. The conduit 37 can be closed by a valve 9. A conduit 38 is provided with a valve 10 and serves for a supply of air.

The hydrocarbons from conduit 21 are admitted to the burner 39 and by the burner lance 40 acting as a nozzle are sprayed into the reactor. During normal operation the hydrocarbons are sprayed into reactor 20 under the action of their supply pressure of about 30–170 kilograms per square centimeter. The partial oxidation in the reactor 20 takes place under the coaction of the gasifying agents which are supplied from conduit 22 into the burner chamber 41 and thus cool the burner lance 40 before they flow into the reactor. The reactor 20 is provided with a thermocouple 42 for measuring the internal temperature of the reactor.

The product gas produced in the reactor 20 contains mainly hydrogen and carbon monoxide. It flows first through a waste heat boiler 43 and then at a lower temperature in conduit 44 to a quench tube 45, which is succeeded by a carbon black separator 46. The raw gas is available in conduit 47, to which a branch conduit 48 is connected, which is provided with a valve 15 and leads to the flare stack. The conduit 48 is provided with a pressure gauge 19, at which the pressure inside the reactor 20 is monitored because there are no appreciable pressure losses between the reactor and the gauge 19.

Water vapor is produced in the waste heat boiler 43 and discharged in conduit 49. A conduit 50 branches from conduit 49 and supplies water vapor through conduit 11 into the hydrocarbon supply conduit 21. The water vapor introduced in conduit 21 is sometimes referred to hereinafter as blow-out steam because it may be used for cleaning and cooling the burner lance 40. A conduit 51 provided with a valve 12 branches from the product gas conduit 44 and leads to a preheating chimney. The preheating chimney and an associated preheating burner (not shown) serve to preheat the reactor 20 when its internal temperature falls below a threshold value of about 900° C. Water is supplied to the waste heat boiler 43 in conduit 52 to replace evaporated water. Quench water is supplied to the quench tube 45 in conduit 53 provided with the valve 13. A conduit 54 connected to the carbon black seperator 46 serves to drain water and carbon black and may be opened and closed by a valve 14.

Figure 2:
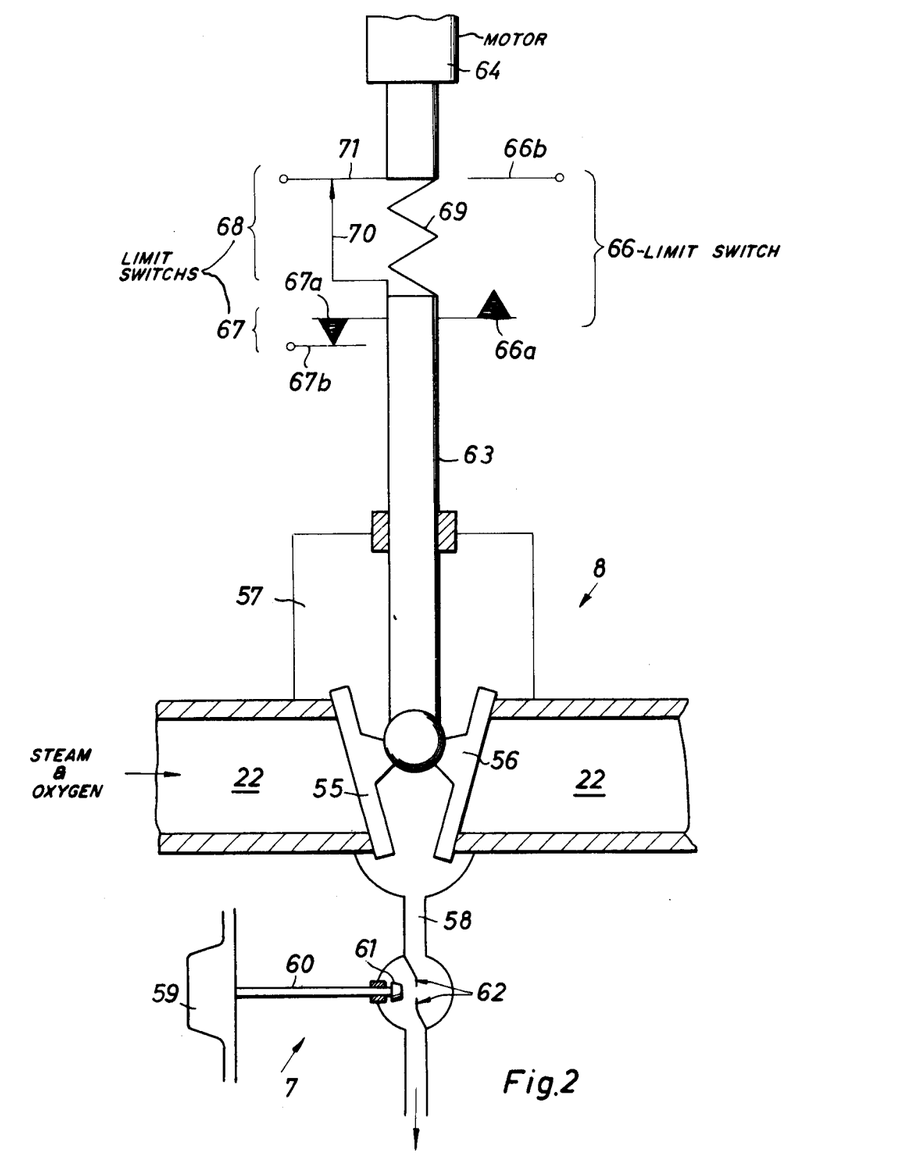
FIG. 2 is a vertical sectional view showing the shut-off valve in the gasifying agent conduit.

FIG. 2 is a somewhat simplified representation of the shut-off valve fittings 7 and 8 for opening and closing the gasifying agent conduit 22. The fitting 8 is a split-wedge gate valve, which is shown in closed position in FIG. 2. If the pressure in one of the two branches of conduit 22 is less than about 30 kilograms per square centimeter, the valve disc 55 or 56 is stiff enough to seal. If the pressure is higher, a slight opening of the seated valve disc cannot be entirely avoided so that there is a certain leak and gasifying agent can enter the valve housing 57. The pressure in the housing 57 acts also on the other disc and forces the latter tightly against its seat. For a pressure relief, the housing is provided with a tap conduit 58, which when the valve 7 is open delivers the gasifying agent into the open. The valve 7 is shown in an open position in FIG. 2 and is closed by a supply of compressed air into a diaphragm 59, which then urges a valve stem 60 and a valve member 61 against a valve seat 62.

To open the gate valve 8, the stem 63 and the discs 55 and 56 connected thereto are pulled upwardly by an electric motor 64. The opened position of the valve 8 is signalled by a displacement-dependent limit switch 66, which is tripped when the trip member 66a engages the contact 66b. The closed position of the valve 8 is signalled by two switches, namely, a displacement-dependent limit switch 67, and additionally by a force-dependent limit switch 68, which is independent of switch 67. The displacement-dependent limit switch consists of a trip member 67a and a contact 67b. The force-dependent switch is released when the closing force exerted on the plates 55 and 56 has exceeded a predetermined minimum value. The switch 68 is represented in FIG. 2 in a simplified manner by a spring 69, a feeler 70 and a contact 71. When the closing force acting on the valve stem 63 is sufficiently strong, the spring 69 is compressed so that the feeler 70 and the contact 71 contact each other; this operation initiates in known manner a voltage signal. It is desirable to signal the closed position by two switches because the length of the stem may be increased by a temperature rise in the valve housing 57 so that a limit switch which depends only on displacement may not always be sufficiently reliable as the length of the stem 63 at different temperatures may vary by several millimeters. With other valves, which are not subjected to appreciable temperature differences, the open and closed position may be signalled by displacement-dependent limit switches alone. This is applicable, e.g., to valve 7.

An automatic control of the gasifying plant during periods of out-of-normal operation requires the presence of switching circuits for starting up and shutting down the plant. When the plant has been shut down, the making available of the hydrocarbons and gasifying agents and the holding of the reactor at temperature to enable an immediate restarting are also to be automatically controlled. The control system will be explained with reference to the block circuit diagrams of FIGS. 3 to 6.

Figures 3, 6:
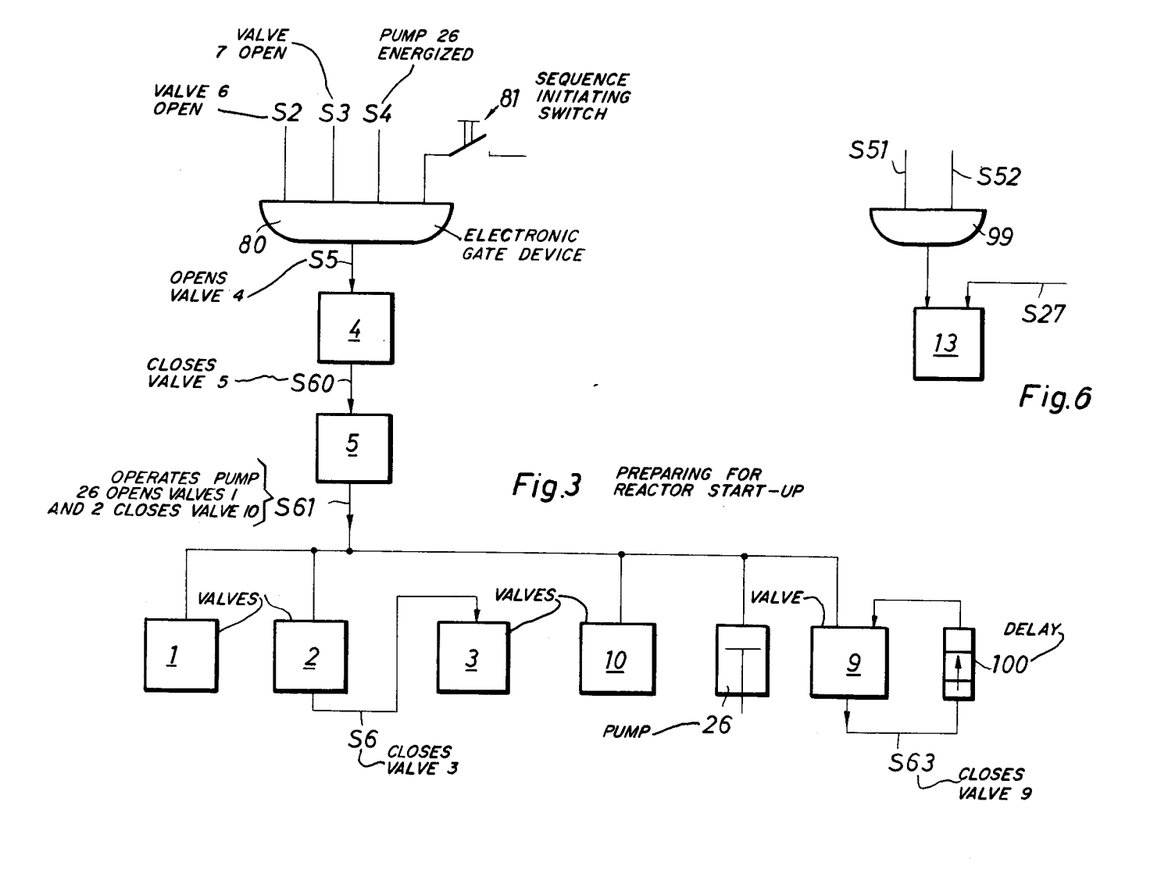
FIG. 3 is a block flow diagram illustrating the control for making the hydrocarbon and gasifying agents available.
FIG. 6 is a block flow diagram illustrating the control for quench water.

When the plant is to be restarted, e.g., when it has been shut down and the reactor has been held at temperature, the valves 3, 5, 6, 7, 10, 11, and 15 are opened and the valves 1, 2, 4, 8, 12, 13, and 14 are closed. It is also assumed that the hydrocarbons to be gasified, such as fuel oil, are available as well as the gasifying agents oxygen and water vapor. With reference to FIG. 3, the process steps and switching operations for preparing the plant for its start-up will be explained. An AND-type electronic gate device 80 has initially three voltage signals applied thereto:

| Voltage signal S2 means: | Valve 6 opened |
|---|---|
| S3: | Valve 7 opened |
| S4: | Metering pump 26 energized. |

When an operator operates the subsequence-initiating switch 81 to apply an additional voltage signal S5, which causes the valve 4 to open. When this has been accomplished, a voltage signal S60 is delivered to close valve 5. The closing of the valve 5 initiates a voltage signal S61 so that the metering pump 26 is caused to operate at its set capacity, and the valve 9 is opened so that nitrogen can flow into conduit 22 and the reactor 20. S61 also causes a slow opening of valve 1, which consists of an automatic flow rate control valve, and an opening of valve 2. When valve 2 is open it produces a voltage signal S6 so that the valve 3 is closed. S61 also causes a closing of valve 10. The gasifying agents now flow into the open through the open valve 6 and conduit 36 and the hydrocarbons to be gasified are circulated at the full rate by being pumped back to the container in conduit 27, the open valve 4, and conduit 30. By a signal S63, which passes through a delay line 100, the valve 9 is closed about 2–5 minutes after it has been opened.

The following starting of the plant is effected by a control sequence which will be explained with reference to FIG. 4. The following voltage signals are initially applied to a checking AND-gate 82:

S1 : Valve 10 closed;
S8 : Oxygen rate not too high;
S9 : Oxygen rate not too low;
S10: Valve 3 closed;
S11: Valve 9 closed;
S12: Reactor temperature above 900° C.;
S13: Water vapor rate in conduit 33 not too low;
S14: Hydrocarbon rate in conduit 27 not too low;
S15: Valve 12 closed;
S16: Valve 15 open.

Signals S8 and S9 are delivered by the flow rate meter 32, the signal S12 is delivered by the thermocouple 42, signal S13 by the flow rate meter 34 and S14 by the flow rate meter 29. When all signals S1 and S8–S16 are applied, the AND-gate 82 delivers a signal S17 which lights a signal lamp 83. This indicates, i.e., that the rates of feedstock and of gasifying agents as well as the temperature in the reactor 20 are normal. The signal S17 passes also through a delay line 84, which causes an adjustable time delay in a range of 2–5 minutes. After this time delay, an additional signal lamp 85 is lighted to indicate to the operator that a subsequence-initiating pushbutton 86 is to be pressed if the start-up of the plant is to be continued. When the signal S17 and the voltage signal produces by the closing of the subsequence-initiating push-button 86 are jointly applied to the AND-gate 87, the same delivers a voltage signal S18, which causes the valve 11 to close. When the valve 11 has been closed, another signal S19 is produced, which together with the signal S18 renders an AND-gate transmitting. The signal S20 delivered by the AND-gate 88 causes the opening of the valve 5 of the hydrocarbon supply conduit 21 and also of the valve 9 for the purge nitrogen. The opening of the valve 5 initiates a voltage signal S21, which causes the valve 4 to close so as to close the conduit 30 for returning the hydrocarbons to the tank.

Figure 4:
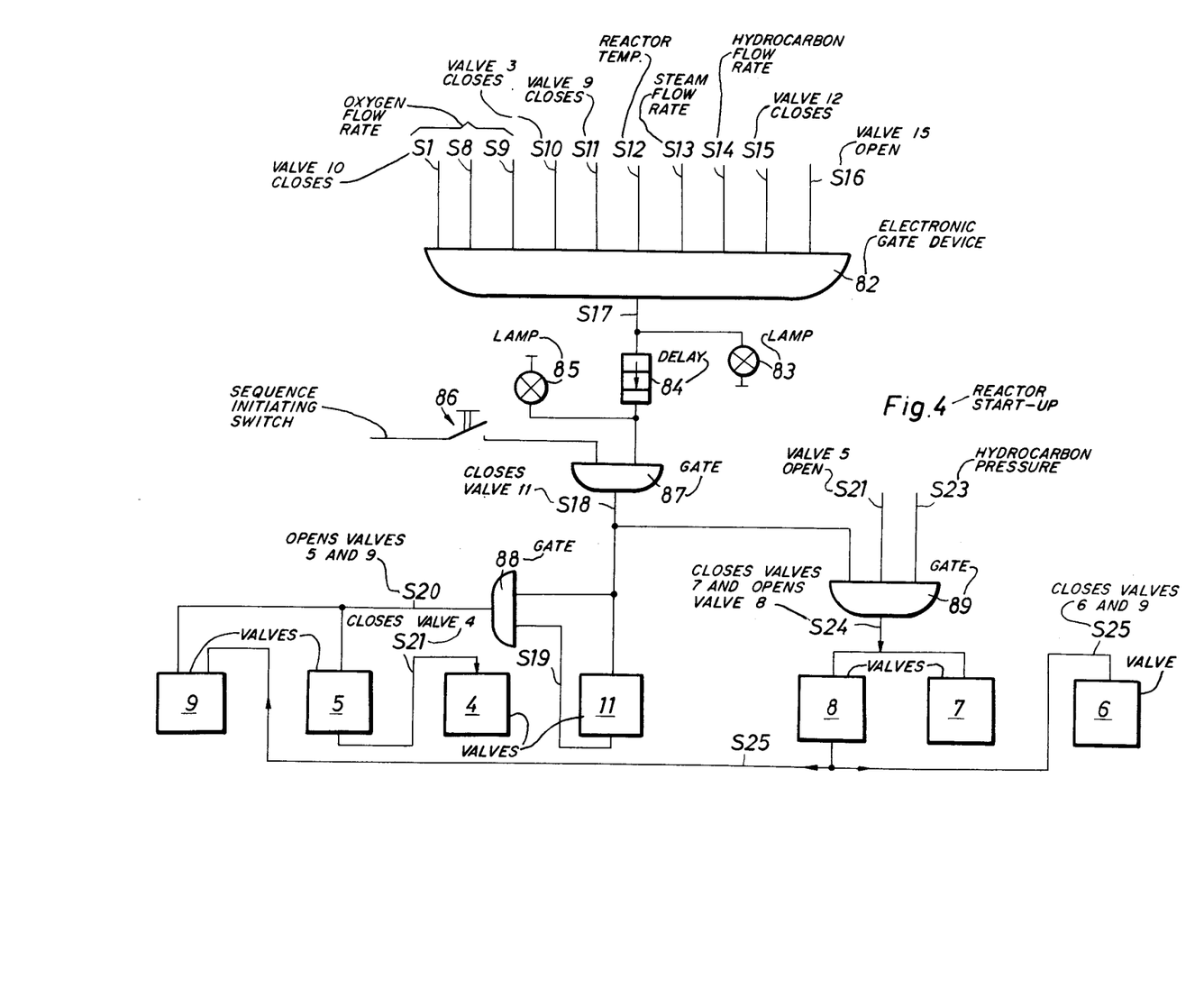
FIG. 4 is a block flow diagram illustrating the control for start-up of the plant.

It is also apparent from FIG. 4 that another AND-gate 89 produces an output in response to the simultaneous application thereto of the signal S18, the signal S21 (valve 5 open) and the signal S23 (by which the pressure gauge 28 indicates that the hydrocarbon pressure is in the desired range between 20 and 100 kilograms per square centimeter). The signal S24 from the AND-gate 89 closes the valve 7 and opens the gate valve 8 at the same time so that the gasifying agents can now flow through conduit 22 to the reactor. When the gate valve 8 has been opened, a voltage signal S25 is initiated, which causes the valves 6 and 9 to close.

During the start-up control sequence, nitrogen must be supplied into the reactor through conduit 37, the open valve 9 and the conduit 22 before the hydrocarbons enter from conduit 21. It has been found that otherwise oil mists could flow back into the burner chamber 41 so that a renewed supply of oxygen would initiate a fire in chamber 41. As the gasifying reaction in the reactor 20 begins, the gas pressure in the reactor builds up. When a certain treshold value of, e.g., 65 kilograms per square centimeter has been reached, the pressure gauge 19 delivers a voltage signal S27, see FIG. 6, which causes the valve 13 to open and enable a supply of quench water to the quench tube 45.

When the valve 5 is open and the valve 4 is closed, the conduit 21 is filled and the burner lance 40 which is constructed like a nozzle causes a further pressure rise in that conduit. The pressure rise is sensed by the pressure gauge 28 and indicates a flow of oil into the reactor. For this reason the pressure gauge 28 is the most suitable means to initiate the decisive voltage signal S23 for the production of S24 for controlling the valves 7 and 8. The valve 14 is a normal level control check valve, which opens when the water level in the carbon black seperator is excessive. For this reason the valve 14 need not be controlled by a voltage signal.

Figure 5:
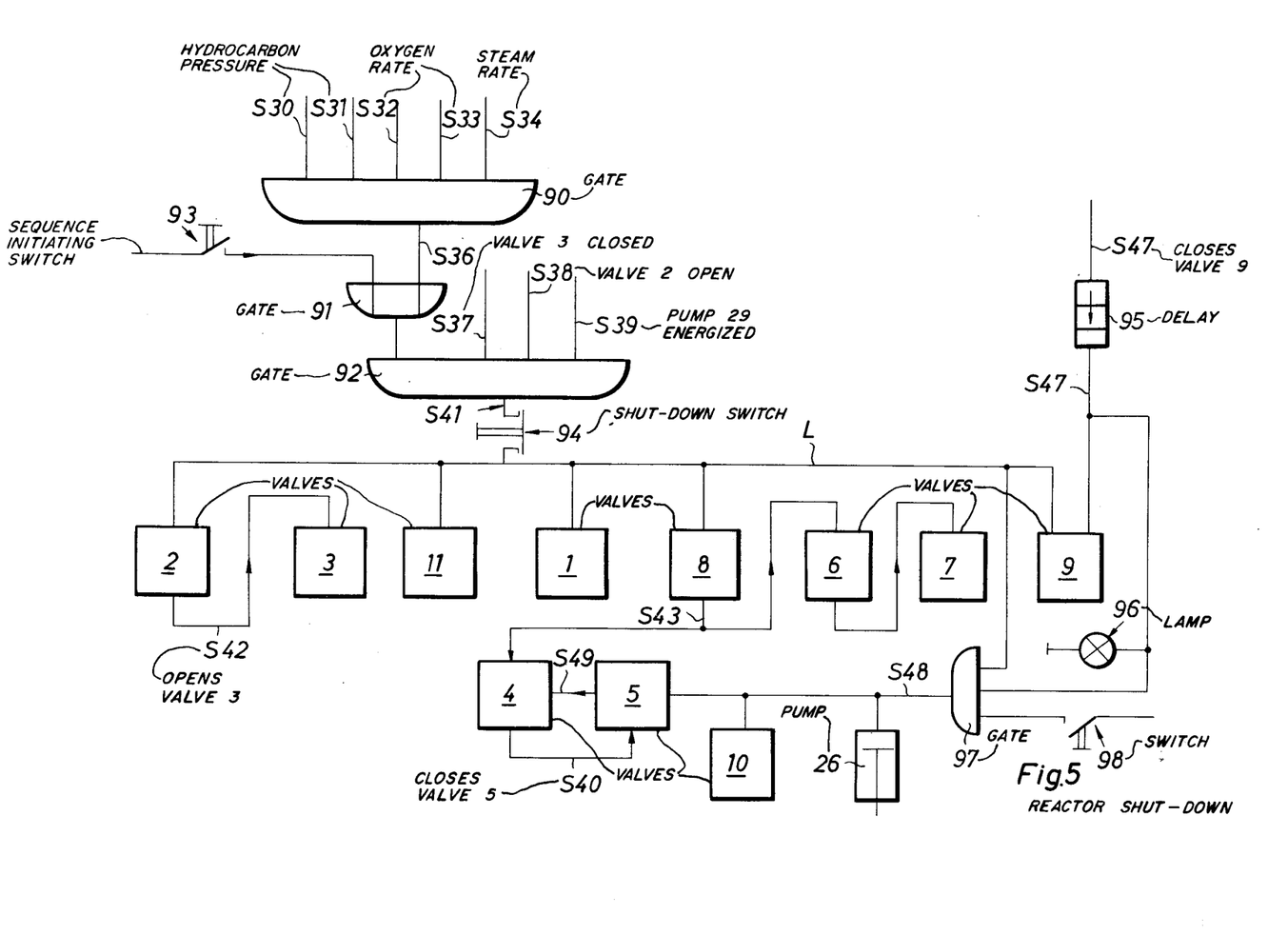
FIG. 5 is a block flow diagram illustrating the control for temporary shut-down and holding at a given temperature.

The shut-down of the plant may be initiated by a trouble and arbitrarily by an operator. This control is illustrated in FIG. 5. The conduits and the associated signals have the following meanings:

S30: Hydrocarbon pressure in conduit 27 not too high;
S31: Above pressure not too low;
S32: Oxygen rate not too high;
S33: Above rate not too low;
S34: Water vapor rate measured by the flow meter 34 not too low.

During normal, trouble-free operation all signals S30–S34 are applied to the AND-gate 90 and this produces the signal S36, which by an OR-gate 91 is transmitted to another AND-gate 92. The signal S36 may be substituted by a signal which is manually produced by a switch 93 when the measuring instruments 28, 32, and 34 are to be attended to during the operation of the plant. The AND-gate 92 is controlled by the following additional signals:

S37: Valve 3 closed;
S38: Valve 2 opened;
S39: Metering pump 26 energized.

When all signals are applied to the AND-gate 92, the same produces an output signal S41. The circuit is arranged so that the shut-off sequence proceeds only when line L is deenergized. This may be ensured by a manual opening of an emergency shut-down switch 94 or, when the switch 94 is in its normal, closed condition, because the signal S41 is not produced as one of the above-mentioned signals S30–S39 is absent. When no voltage is applied to line L, the following sequence is performed to shut down the plant.

The valve 2 is rapidly closed to that signal S42 causes valve 3 to open. Valve 1 and gate valve 8 are also closed; valves 9 and 11 are opened. S43 produced in response to the closing of gate valve 8 opens also valve 4 and as soon as this has been opened the valve S40 causes the valve 5 to close. As a result, the gasifying operation is now interrupted and the reactor 20 is purged with nitrogen flowing from conduit 37 through the open valve 9 and the conduit 22. The blow-out steam flowing from conduit 50 through valve 11 purges and cools the burner lance 40. As soon as the pressure gauge 19 senses a pressure drop in the reactor 20 below, e.g., 6 kilograms per square centimeter, a signal S47 causes the valve 9 to close and the signal lamp 96 is lighted to indicate that the nitrogen purge is discontinued. The delayed voltage signal S47 is applied also to an AND-gate 97, which also receives the inverted pulse from line L. The lighting of lamp 96 calls on the operator to decide whether or not the reactor is to be held at temperature. If the operator decides that the reactor is to be held at temperature, he depresses the push-button 98 so that the AND-gate 97 delivers a signal S48. S48 causes the valve 5 in the hydrocarbon supply conduit to reopen and enables a supply of air through conduit 38 and the now open valve 10 into the reactor 201. The metering pump 26 is set to a low capacity at the same time. When the valve 5 is open, the signal S49 causes the valve 4 to close. The rate of hydrocarbons, generally fuel oil, required to hold the reactor at temperature is about 0.5–5% of the throughput rate used during normal operation. This slight oil rate cannot be atomized by the burner lance 40 having the selected geometry. This is now accomplished by the blow-out steam, which flows from conduit 50 through the previously opened valve 11 into conduit 21. The blow-out steam rate is adjusted to produce at the burner lance a pressure loss which is higher than the pressure between the feed pump 25 and the metering pump 26 so that the metering pump 26, consisting usually of a reciprocating piston pump, continues its metering operation. For the conditions encountered in practice, the pressure of the blow-out steam in the conduit 50 is adjusted to about 30–80 kilograms per square centimeter. This is sufficient for an atomization of oil at the low rate into the reactor 20 is burnt with air from conduit 38 so that the temperature in the reactor is preferably held above 900° C. This facilitates the immediate restarting of the plant.

When a holding of the reactor 20 at temperature is not desired, the push-button 98 is not depressed and the reactor is pressure-relieved to atmospheric pressure after some time, e.g., in that the valve 15 is opened further by hand so that the remaining gas can quickly escape into the open. To shut off the quench water, the valve 13, see FIG. 6, is closed when both signals S51 and S52 are simultaneously applied to the AND-gate 99. S51 produced by the pressure gauge 19 indicates that the pressure in the reactor is below a minimum value of, e.g., 11 kilograms per square centimeter. S52 is produced when the hydrocarbon pressure in conduit 27 is less than the predetermined threshold value, which is adjusted in the range of 20–100 kilograms per square centimeter.

What is claimed is:

1. In a process for thermally gasifying hydrocarbons with oxygen and steam under pressure in the range of 3–100 kilograms per square centimeter and at temperatures in the range of about 1000–1500°C wherein the gasification reaction is carried out in a reactor having temperature measuring means, valved conduits for the supply of hydrocarbons, oxygen, steam and an inert purging gas, and valved blow-off conduits for venting oxygen and steam, the hydrocarbon supply conduit connecting a nozzle in the reactor and a hydrocarbon supply tank and having a feed pump and a valved recycle conduit for returning hydrocarbon to the supply tank from the hydrocarbon supply conduit, and the product gas from the gasification reactor is cooled and scrubbed, the improvement which comprises carrying out the following sequence of steps during start-up of the gasification reactor via an electric circuit as shown in FIGS. 3 and 4:
   i. receiving at a first electronic gate device (80) signals (S2) and (S4) indicating that the hydrocarbon feed pump (26) is energized and the blow-off conduit (36) is open;
   ii. sending a signal via switch (81) to said first gate device (80) whereupon said first gate device emits a signal (S5) causing the hydrocarbon recycle conduit (30) to open via valve (4) and the hydrocarbon supply conduit (21) to close via valve (5) thereby causing hydrocarbons normally fed to the reactor to be recycled;
   iii. the closing of the hydrocarbon supply conduit (21) emitting a signal (S61) causing at least the opening of the oxygen supply conduit (31) via valve (1);
   iv. receiving signals (S8), (S9), (S13) and (S14) at a second gate device (82) from the supply conduits for hydrocarbons (21), oxygen (31) and steam (33) whereupon a signal (S17) is given to initiate a second signal via switch (86) which causes the purge gas supply conduit (37) to open via valve (9), the hydrocarbon supply conduit (21) to open via valve (5) and the oxygen and steam supply conduit (22) to open via valve (8); and
   v. the opening of the oxygen and steam supply conduit (22) emitting signal (S25) causing the purge gas conduit (37) to close via valve (9) and the blow-off conduit (36) to close via valve (6).

2. In a process for thermally gasifying hydrocarbons with oxygen and steam under pressure in the range of 3–100 kilograms per square centimeter and at temperatures in the range of about 1000°–1500°C wherein the gasification reaction is carried out in a reactor having temperature measuring means, valved conduits for the supply of hydrocarbons, oxygen, steam and an inert purging gas, and valved blow-off conduits for venting oxygen and steam, the hydrocarbon supply conduit connecting a nozzle in the reactor and a hydrocarbon supply tank and having a feed pump and a valved recycle conduit for returning hydrocarbon to the supply tank from the hydrocarbon supply conduit, and the product gas from the gasification reactor is cooled and scrubbed, the improvement which comprises carrying out the following sequence of steps to prepare the gasification reactor for start-up via an electric circuit as shown in FIG. 3:
   i. receiving at a first electronic gate device (80) signals (S2) and (S4) indicating that the hydrocarbon feed pump (26) is energized and the blow-off conduit (36) is open;
   ii. sending a signal via switch (81) to said first gate device (80) whereupon said first device emits a signal (S5) causing the hydrocarbon recycle conduit (30) to open via valve (4) and the hydrocarbon supply conduit (21) to close via valve (5) thereby causing hydrocarbons normally fed to the reactor to be recycled;
   iii. the closing of the hydrocarbon supply conduit (21) emitting a signal (S61) causing the opening of the oxygen supply conduit (31) via valve (1), the operation of the hydrocarbon feed pump (26) and the closing of purge-conduit (37) via valve (9);

iv. the opening of the oxygen supply conduit (31) emitting a signal (S6) causing the oxygen relief conduit (35) to close via valve (3).

3. In a process for thermally gasifying hydrocarbons with oxygen and steam under pressure in the range of 3–100 kilograms per square centimeter and at temperatures in the range of about 1000°–1500°C wherein the gasification reaction is carried out in a reactor having temperature measuring means, valved conduits for the supply of hydrocarbons, oxygen, steam and an inert purging gas, and valved blow-off conduits for venting oxygen and steam, the hydrocarbon supply conduit connecting a nozzle in the reactor and a hydrocarbon supply tank and having a feed pump and a valved recycle conduit for returning hydrocarbon to the supply tank from the hydrocarbon supply conduit, and the product gas from the gasification reactor is cooled and scrubbed, the improvement which comprises carrying out the following sequence of steps during start-up of the gasification reactor via an electric circuit as shown in FIG. 4:

receiving signals (S8), (S9), (S13) and (S14) at a gate device (82)

from the supply conduits for hydrocarbons (21), oxygen (31) and steam (33), signal (S10) indicating that the oxygen relief conduit (35) is closed via valve (3), signal (S11) indicating that the purge gas conduit (37) is closed via valve (9) and signal (S12) indicating that the reactor temperature is above 900°C, whereupon signal (S17) is given which initiates signal (S18) which causes the purge gas supply conduit (37) to open via valve (9), the hydrocarbon supply conduit (21) to open via valve (5), signal (S18) also initiating signal (S24) which causes the oxygen and steam supply conduit (22) to open via valve (8), the opening of valve (8) initiating signal (S25) which closes blow-off conduit (36) via valve (6) and purge gas conduit (37) via valve (9).

4. In a process for thermally gasifying hydrocarbons with oxygen and steam under pressure in the range of 3–100 kilograms per square centimeter and at temperatures in the range of about 1000°–1500°C wherein the gasification reaction is carried out in a reactor having temperature measuring means, valved conduits for the supply of hydrocarbons, oxygen, steam and an inert purging gas, and valved blow-off conduits for venting oxygen and steam, the hydrocarbon supply conduit connecting a nozzle in the reactor and a hydrocarbon supply tank and having a feed pump and a valved recycle conduit for returning hydrocarbon to the supply tank from the hydrocarbon supply conduit, and the product gas from the gasification reactor is cooled and scrubbed, the improvement which comprises carrying out the following sequence of steps during shut down of the gasification reactor via an electric circuit as shown in FIG. 5:

i. receiving signals (S30–34) at gate device (90) from the supply conduits for hydrocarbons (21), oxygen (31) and steam (33) whereupon signal (S36) is sent to gate device (91) which also receives a signal from switch (93);

ii. receiving a signal from gate device (91) and signals (S37–39) from the oxygen supply conduit (31) and the hydrocarbon feed pump (26) at gate device (92) which thereupon emits signal (S41);

iii. signal (S41) initiating a shut-down sequence which includes closing of the oxygen and steam supply conduit (22), via valve (8), closing of the hydrocarbon supply conduit (21) via valve (5) and opening of the hydrocarbon recycle conduit (30) via valve (4), and opening the inert purging gas conduit (37) via valve (9).

* * * * *